United States Patent [19]

Baukol et al.

[11] Patent Number: 4,804,265

[45] Date of Patent: Feb. 14, 1989

[54] AIRCRAFT LANDING LIGHT ALIGNMENT SYSTEM

[75] Inventors: David E. Baukol, Auburn; Dennis L. Bod, Federal Way; Robert F. Mittelstadt, Auburn, all of Wash.

[73] Assignee: The Boeing Company, Seattle, Wash.

[21] Appl. No.: 364,343

[22] Filed: Apr. 1, 1982

Related U.S. Application Data

[63] Continuation-in-part of Ser. No. 261,077, May 6, 1981, abandoned.

[51] Int. Cl.⁴ .......................... G01B 11/26; G01B 5/24
[52] U.S. Cl. ...................................... 356/152; 33/288; 33/335; 356/153; 356/400; 356/121
[58] Field of Search ............... 356/141, 152, 400, 153, 356/121; 33/288, 335

[56] References Cited

U.S. PATENT DOCUMENTS

| | | | |
|---|---|---|---|
| 2,308,095 | 1/1943 | Meeder | 356/121 |
| 3,435,232 | 3/1969 | Sorensen | 356/121 |
| 3,551,057 | 12/1970 | Hamilton et al. | 356/152 |
| 3,778,168 | 12/1973 | Willner | 356/152 |
| 3,790,276 | 2/1974 | Cook et al. | 356/152 |
| 3,830,570 | 8/1974 | Groetzner | 356/121 |
| 3,905,704 | 9/1975 | Mitsui et al. | 356/121 |
| 3,907,435 | 9/1975 | Roodvoets | 356/152 |
| 4,023,908 | 5/1977 | Johnson et al. | 356/400 |
| 4,092,071 | 5/1978 | Puyplat | 356/121 |
| 4,120,589 | 10/1978 | Mima et al. | 356/121 |
| 4,295,740 | 10/1981 | Sturges | 356/152 |

Primary Examiner—Stephen C. Buczinski
Attorney, Agent, or Firm—Conrad O. Gardner; B. A. Donahue

[57] ABSTRACT

A system for aircraft landing light alignment which includes a target of photocells distributed in a cross-like manner with a single photo detector centered about the common point of the cross-like distribution. A signal processing circuit coupled to the output of the target includes electronic readout devices distributed in a cross-like manner for indicating which way the beams should be directed to provide correct light adjustment. The aircraft landing light alignment system includes signal processing of photo detector derived signals which measures only the outer fringes of the Gaussian beam distribution.

3 Claims, 7 Drawing Sheets

AIRCRAFT LANDING LIGHT ALIGNMENT SYSTEM

This application is a continuation-in-part of application Ser. No. 261,077 filed 5-6-81, now abandoned, assigned to The Boeing Company.

The present invention relates to a method and apparatus for alignment of aircraft landing lights, and more particularly to a system and method for alignment of aircraft landing lights which include a cross-like target structure for beam receiving and readout which includes light alignment signal processing for providing an accuracy of about ± one inch at a target distance of about twenty-two feet under direct daylight conditions through utilization of a single operator.

Alignment of aircraft landing and taxi lights has presented a difficult problem over a long period of time to those skilled in the art. This has been due to the fact that manufacturing variances in lens curvature, reflector shape, and filament position results in the creation of different lighting characteristics in each lamp. Due to the relatively short life of the average lamp (about 100 hours), a great deal of time and expense has resulted from the replacement and re-alignment of lamps. Improper light alignment can also be disturbing to an aircraft operator because of cloud reflection glare and incomplete runway illumination.

Each time a landing light is changed, the alignment should be adjusted to correct for the aforementioned manufacturing variances. Prior methods of adjustment have included positioning of the aircraft at night with a fixed target or the utilization of a three-prong adjustment tool to mechanically fix the unlighted lamp. Both methods are time consuming and of questionable accuracy.

In view of the hereinabove referenced aircraft landing light alignment problems, it is an object of the present invention to provide an aircraft landing light alignment system which is accurate, capable of single operator operation for alignment of a lamp, and operational during day or night light conditions.

It is yet another object of the present invention to provide light sensing means responsive to the intensity of a light beam within the area defined by the light sensing means for computing the center of the beam pattern and providing a readout indicative of the center of the beam pattern.

Heretofore the patent literature as exemplified by U.S. Pat. No. 3,435,232 issued Mar. 25, 1969 has shown systems which included a detector in contrast to the present system embodiment which relates to a light adjustment system. Further illustrative of the prior art patent literature is U.S. Pat. No. 3,435,232 which shows sensitivity to ambient and highlight intensities in contrast to the present system which incorporates sun shielding means and filtering to provide for utilization of the preferred embodiment in both high intensity light fields which include sunlight conditions. The aforementioned Sorenson system of U.S. Pat. No. 3,435,232 measures the complete beam intensity in contrast to the present system embodiment which measures only the outer fringes of the Gaussian beam distribution. Also, the Sorenson system represents a full-length photocell (rectangular) in contrast to the present system which utilizes five individual photodetectors distributed over a cross-like target structure. Also, the Sorenson system, since utilizing a full-length photocell, is limited in physical length, whereas the present photocell distribution is necessary for detection of the Gaussian distribution of aircraft landing light lamp beams.

Further exemplary of the prior art patent literature is U.S. Pat. No. 4,120,589 issued Oct. 17, 1978, to Mima et al. The Mima et al patent reference shows a method and apparatus for measuring the distribution of a light field about the topical axis of a light source and in which a screen and detector is utilized to locate the center of an optical axis of a light source in contrast to where this beam is physically located in regard to desired centerline of a projected beam in accordance with the preferred embodiment of the present invention. The Mima et al system provides a device to map the center of a light source only. In contrast, the present light alignment system enables adjustment of a lamp to a predetermined point in space in relationship to the aircraft buttock-line and station location. In the Mima et al reference, a camera is utilized for measuring the distribution of a light field about the optical axis of the light source.

A further patent literature reference includes U.S. Pat. No. 3,905,704, issued Sept. 16, 1975, which system includes a device for checking the angle deviation of photo diodes in contrast to the present aircraft landing light alignment system embodiment which detects positioning of a landing light source in space.

Yet a further exemplary prior art reference includes U.S. Pat. No. 2,381,586, issued Aug. 7, 1945, to Green. The Green system is a testing system for measuring electrical and light characteristics of a sealed beam headlight and is primarily a fabrication device, not an alignment tool. The device of U.S. Pat. No. 2,381,586 permits an indication of whether the headlight meets the manufacturer's design specification, in contrast to the present system embodiment which utilizes the manufactured beam regardless of its characteristics, and positions the center of its light distribution at a particular point in space. Green fails to provide a solution to the primary function of the present system, viz., aircraft light adjustments to a given location in space. Heretofore, prior art techniques utilized by those skilled in the art have included the following three methods of landing light alignment:

(1) A special alignment fixture technique has been used in which a device which bolts to the aircraft structure is utilized. The device has three fingers, and the landing light is adjusted until the surface of the bulb just touches all three fingers. This method does not take lamp manufacturing tolerances or aircraft structure variances into account. It becomes apparent that unacceptable discrepancies at the point where the pilot of the aircraft would prefer to see the light arise results.

(2) In the method of utilization of a plywood target, a large plywood target is placed at a predetermined location and the light is aimed to provide maximum illumination at the center of the target. Since the human eye cannot accurately judge this condition, the lights are turned on and off and the light adjusted such that the last glow of the lamp filament would occur at the center of the target as the lamp is switched off. Such a method is not an accurate method and further requires the utilization of two operators. Furthermore, performance is required in relatively low (indoor) ambient light conditions.

(3) The prior technique of hand-held light meter in which a hand-held light meter is utilized to find the point of maximum illumination, i.e. center of the beam. This method provides only a fair degree of accuracy because of the difficulty of relating a handheld meter to a specific dimension with respect to the aircraft and the further difficulty in finding the center of the beam. This third method also requires the utilization of two operators and must be performed in relatively low (indoor) ambient light conditions.

Accordingly, a preferred embodiment of the present landing light system invention includes an aircraft landing light detector system for sensing the center of the taxi or landing light beam in which any offset between the center of the lamp light intensity and the physical location of four photocells distributed along a cross-like target structure at the ends thereof is read out in status indicators as a linear displacement about the two orthogonal axes perpendicular to the light beam's axis.

A preferred embodiment of the present invention includes readout devices distributed on the cross-like target assembly which are readable from the light adjustment position aboard the aircraft containing the landing light being adjusted.

A full understanding of the present invention, and of its further objects and advantages and the several unique aspects thereof, will be had from the following description when taken in conjunction with the accompanying drawings in which.

Figure 1:
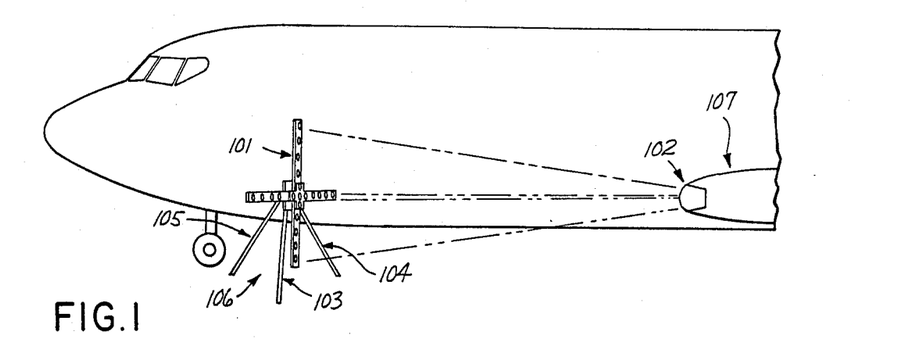
FIG. 1 is a view in perspective showing the cross-like target structure located at a predetermined distance from the wing-mounted landing light of an aircraft for the purpose of aligning the aircraft landing light.

Turning now to FIG. 1, it can be seen that cross-like target structure 101 is positioned directly in front of wing-mounted aircraft landing light 102 at a distance in the range of 18 to 30 feet, viz. at about 22 feet. Cross-like target structure 101 is supported by camera-type tripod 106 having adjustable legs 103, 104 and 105, thereby providing target height adjustment to predetermined and desired target height elevations. A scale (not shown) has been engraved on tripod 106 to provide direct target height adjustment measurements. Camera tripod 106 provides cross-like target structure 101 height adjustment to desired engineering requirements in the range from about 15 to about 144 inches. This height adjustment range permits movement of the cross-like target assembly 101 to the desired light path center point from aircraft landing light 102.

Figure 2:
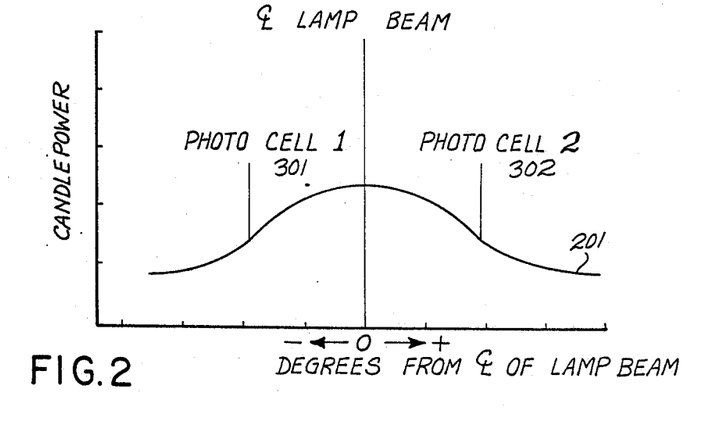
FIG. 2 is a graph illustrative of typical light output characteristics of the aircraft landing light shown in FIG. 1 further showing disposition of horizontal (or vertical) photocells which is deemed helpful in understanding the light beam centering technique of the present system and process of alignment.
Figure 3:
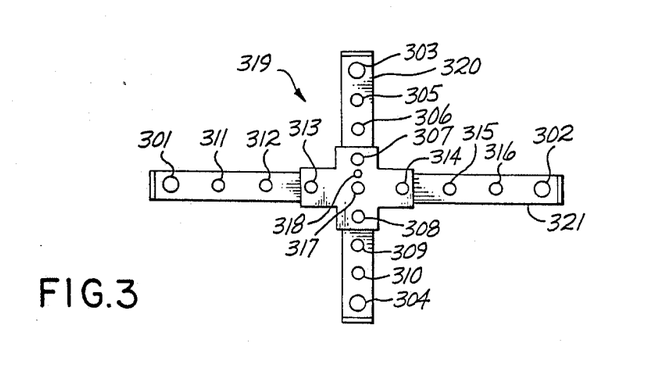
FIG. 3 is a front view of the cross-like target structure of FIG. 1 showing in more detail the disposition of status indicator and light sensor transducers on the target structure itself.

Turning now to the graph of FIG. 2 for an understanding of the principles of operation of the present aircraft landing light alignment system, it will be seen that FIG. 2 is illustrative of typical light output characteristics of an aircraft landing light 102 shown on the wing 107 of the aircraft of FIG. 1. Horizontal photocells 301 and 302, as seen in FIG. 3, disposed on the horizontal arm of cross-like target assembly 101 and vertical photocells 303 and 304 disposed on the vertical arm of target-like assembly 101 of FIG. 1 are arranged so that the light intensity at the photocells is approximately one-half the peak intensity occurring when the light beam is centered between the cells. Referring to FIG. 2, it would be observed that the center of the light beam emanating from wing-mounted landing light 102, when moved towards photocell 301, will increase the output of photocell 301 while the output of photocell 302 will decrease, since the output of each photocell is proportional to the amount of light incident thereon. This difference in output from each cell will cause horizontal status indicators 311 through 316, as seen in FIG. 3, to deviate from center status indicator 317. Deviation in readout from center status indicator 317 on vertical status indicators 305 through 310 will occur in the same manner when the beam is adjusted vertically between photocells 303 and 304.

As long as light is incident upon any one of photocells 301, 302, 303 or 304, an indication through readout will appear on a single or pair of status indicators 305 through 317. The alignment, as indicated through readout of status indicators, is not linear due to the light distribution curve 201 seen in FIG. 2. Therefore, the mechanic or operator making the adjustments sets lamp 102 to a center setting on the status indicators, that is he adjusts the lamp 102 until only the center status indicator 317 becomes activated for readout. When cross-like target structure 101 is positioned as hereinbefore discussed at the predetermined distance of about twenty-two feet, then one division from center status indicator 317 is representative of an approximate one inch error in beam positioning at the target structure. The pointing accuracy of one-sixth of a degree is thereby achieved. Thus, it can readily be seen that the present landing light alignment system, when utilized for aircraft landing lamp adjustment and alignment, provides a confidence in repeatability and accuracy not heretofore obtainable.

Turning now to FIG. 3, it will be observed that cross-like target structure 319 comprises a vertical arm member 320 and a horizontal arm member 321, vertical arm member 320 carrying up and down photocells 303 and 304, and horizontal arm member 321 carrying left and right photocells 301 and 302, the photocells being positioned at the respective remote ends of each of the arm members. Vertical status indicators 305, 306, 307, 308, 309, and 310, and horizontal status indicators 311, 312, 313, 314, 315, and 316, are controlled as shown in the schematic circuit diagram of FIGS. 7A and 7B, including the vertical and horizontal status indicator driver circuits shown in FIGS. 8A and 8B and associated center status indicator driver circuit shown in FIG. 9. When aircraft landing light 102 is turned on, then photo transistor 318 near the center of cross-like target structure 319 is energized, thereby activating relay 901 shown in FIG. 9 further causing voltages to be applied to the system of FIGS. 7A, 7B, 8A, 8B, and 9. Cross-like target assembly 319 provides a housing assembly for the system signal processing between vertical and horizontal photocells and output status indicator devices.

Figure 4:
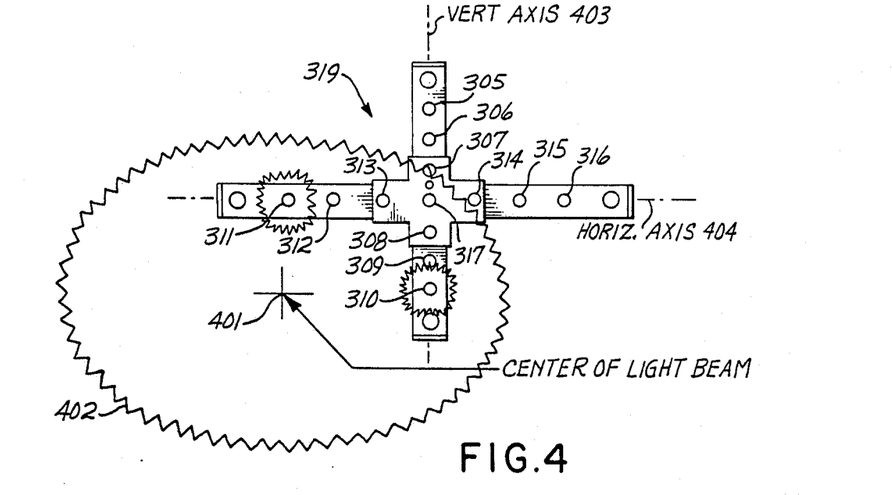
FIG. 4 is a view of the cross-like target structure of FIG. 3 showing operating conditions with the center of the light beam off center to the lower left-hand side of the cross-like target structure.
Figure 5:
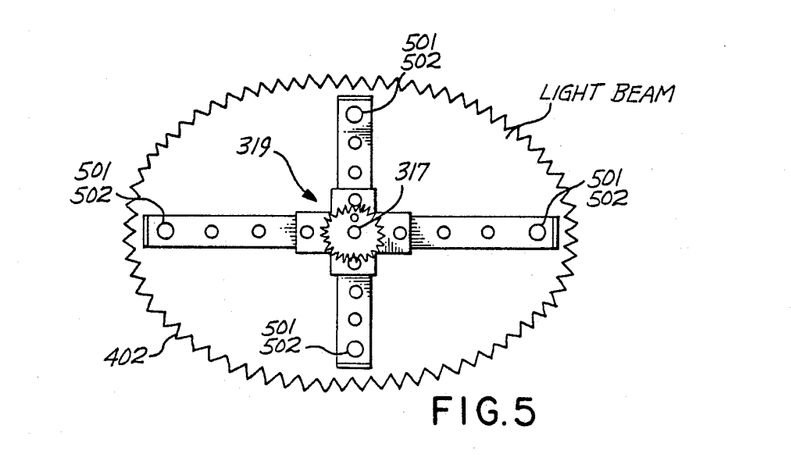
FIG. 5 is illustrative of an operational characteristic of the present target structure of FIG. 3 under conditions where the center of the light beam coincides with the center of the cross-like target structure.

Turning now to FIG. 4 and comparing FIG. 4 with FIG. 5, it will be observed that all status indicators are switched off except two unless the beam is centered on the cross-like target structure as shown in FIG. 5. As noted in FIG. 4, status indicators 310 and 311 are left in the ON position while all remaining status indicators 305 through 309 and 312 through 317 have switched to the OFF position upon energization of aircraft landing lamp 102. The two status indicators 310 and 311 remain in the ON condition as seen in FIG. 4 and show the relative position of the center of light beam 401 as computed by the signal processing circuits of the present system embodiment. Therefore, a single mechanic, positioned at the aircraft lamp 102, is able to judge beam 402 movement, both vertically and horizontally, by observing the condition of the status indicators 305 through 317. As the center 401 of light beam 402 is moved towards the desired position (as shown in FIG. 5) the status indicators 312 and 309 nearer the center position will be switched to the ON condition and status indicators 310 and 311 will then be switched to the OFF condition. Likewise, as the center 401 of light beam 402 is moved even closer to the desired position as seen in FIG. 5, status indicators 308 and 313 will switch to the ON condition and status indicators 309 and 312 will then change to the OFF position.

As can be seen in FIG. 5, it will be observed that only the center status indicator 317 remains switched in the ON condition when light beam 402 is incident upon the center of the cross-like target structure 319. Proper position is, therefore, obtained when the optical axis 401 of light beam 402 is coincident with the intersection of vertical axis 403 and horizontal axis 404 of the arms of target assembly 319.

Figure 6:
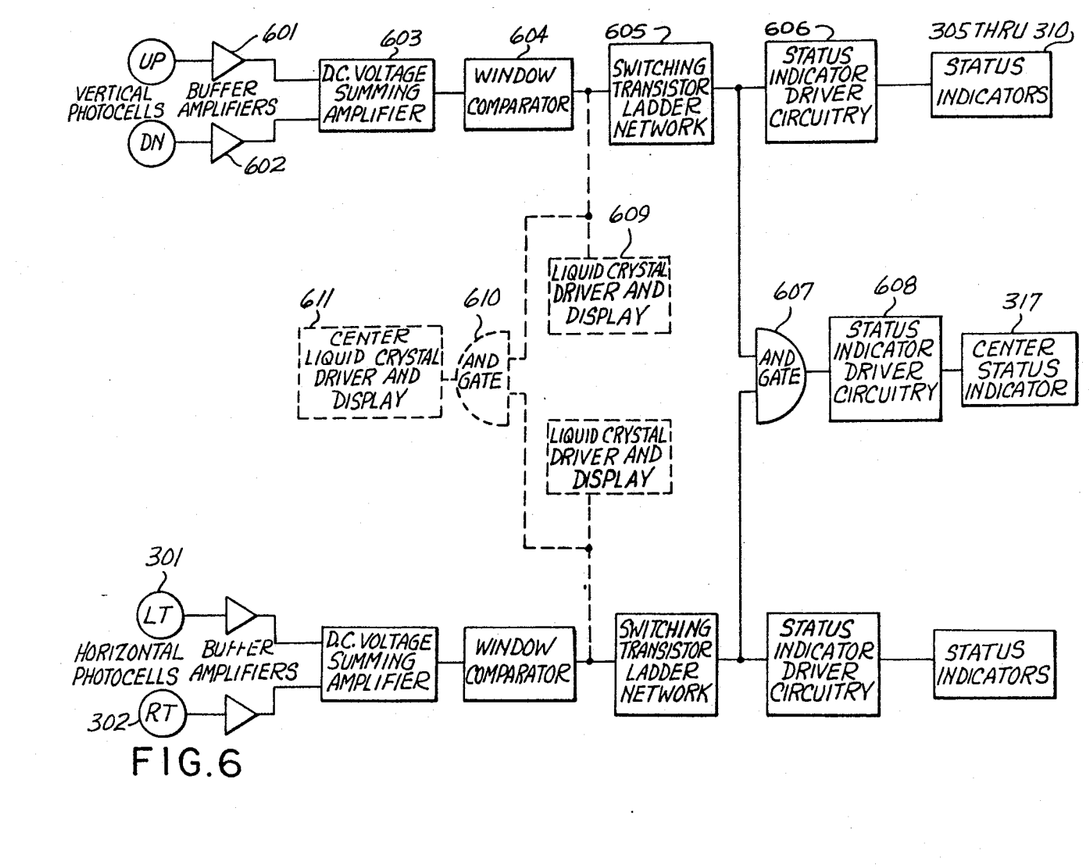
FIG. 6 is a block diagram of the present aircraft landing light alignment system wherein vertical input transducer photocells are shown driving the output status indicators, which photocells and status indicators are utilized on the target embodiment of FIG. 3.

A preferred embodiment of a system block diagram of the present aircraft landing light alignment system is shown in FIG. 6 while the detailed circuit schematic for the system of FIG. 6 is shown in FIGS. 7A, 7B, 8A, 8B, and FIG. 9. Along the vertical sensing and display axis, seen in the upper portion of the system block diagram of FIG. 6, it should be noted that a pair of vertical photocells for detecting beam motion in the up and down direction are coupled to buffer amplifiers 601 and 602 to d.c. voltage summing amplifier 603. D.c. voltage summing amplifier 603 is coupled through window comparator circuitry 604, switching transistor ladder network 605, and status indicator driver circuitry 606 to drive the status indicators 305 through 310. AND gate 607 is seen coupled from switching transistor ladder network 605 through status indicator driver circuitry 608 to center status indicator 317. In a similar manner, horizontal photocells for sensing the left and right beam directions are provided at 301 and 302 with corresponding circuits coupled down stream to drive the horizontal status indicators.

Shown in dotted line configuration in the block diagram of FIG. 6 are additional circuits which may be utilized as an alternate readout display utilizing liquid crystal displays instead of the mechanical status indicators shown in the present preferred embodiment. The optional or dotted line configuration for readout includes vertical liquid crystal driven display 609 coupled through AND gate 610 to center crystal driver and display 611 with corresponding horizontal axis components shown in dotted line form therebelow.

Figure 7A:
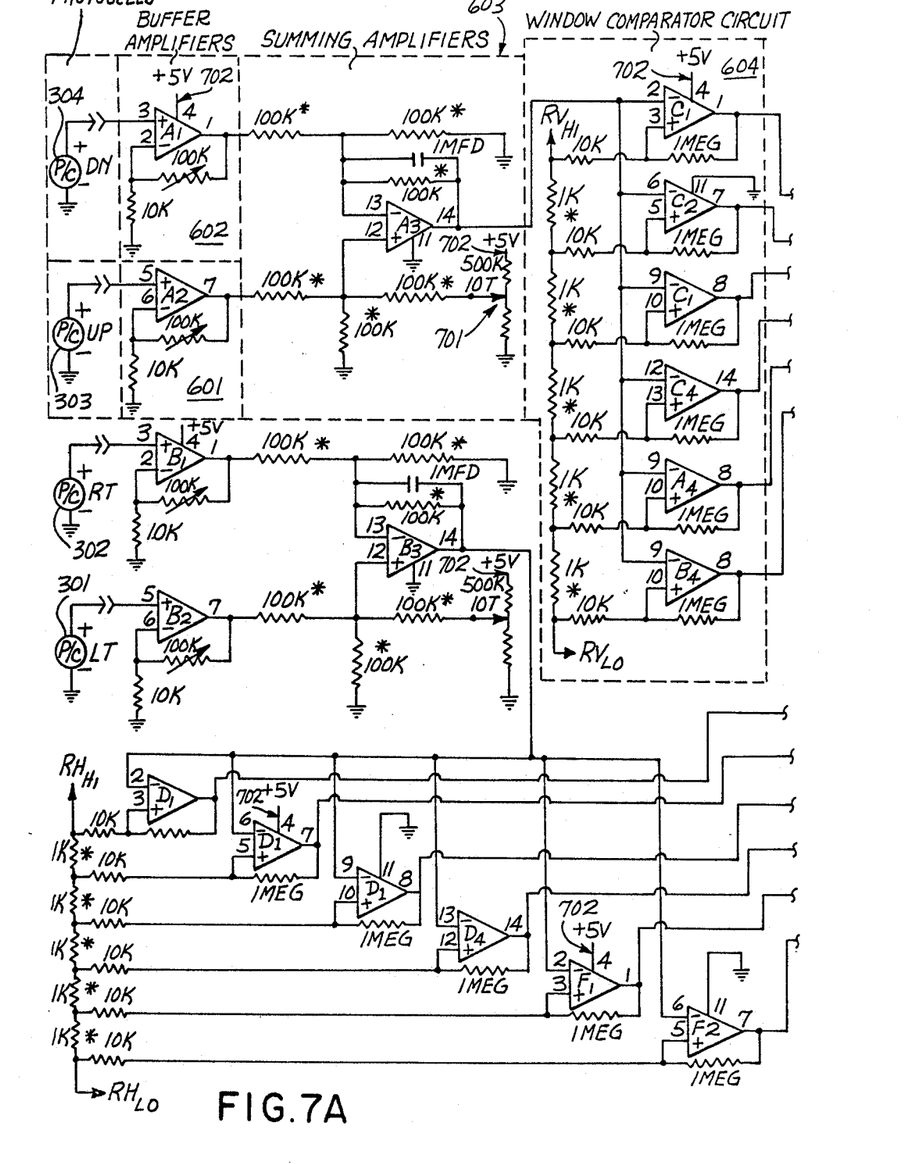
FIGS. 7A and 7B, when placed side by side, are a schematic circuit diagram showing of the present light alignment system signal processing from target input photocells to output voltages for driving the status indicator circuits.
Figure 7B:
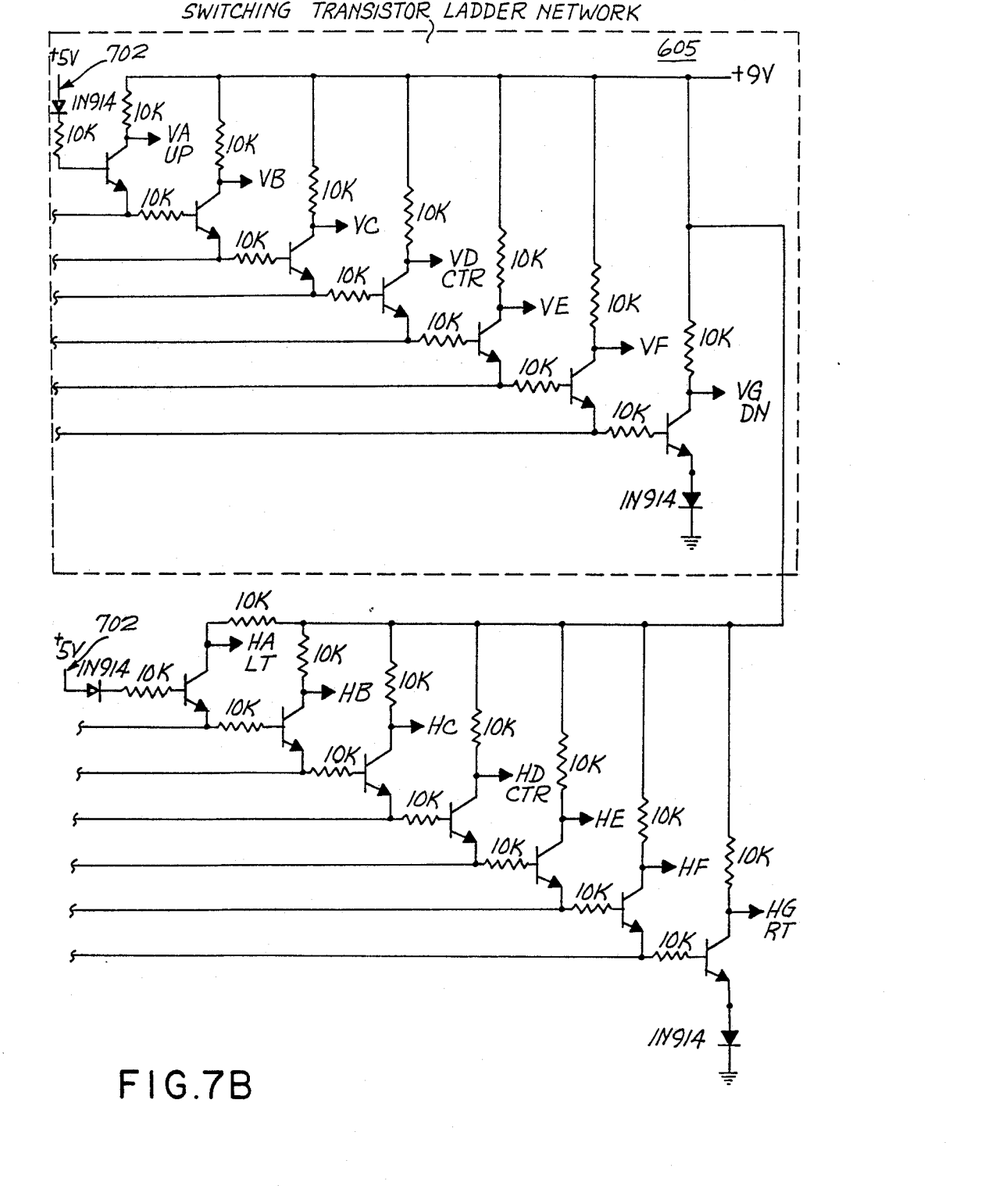
Figure 8A:
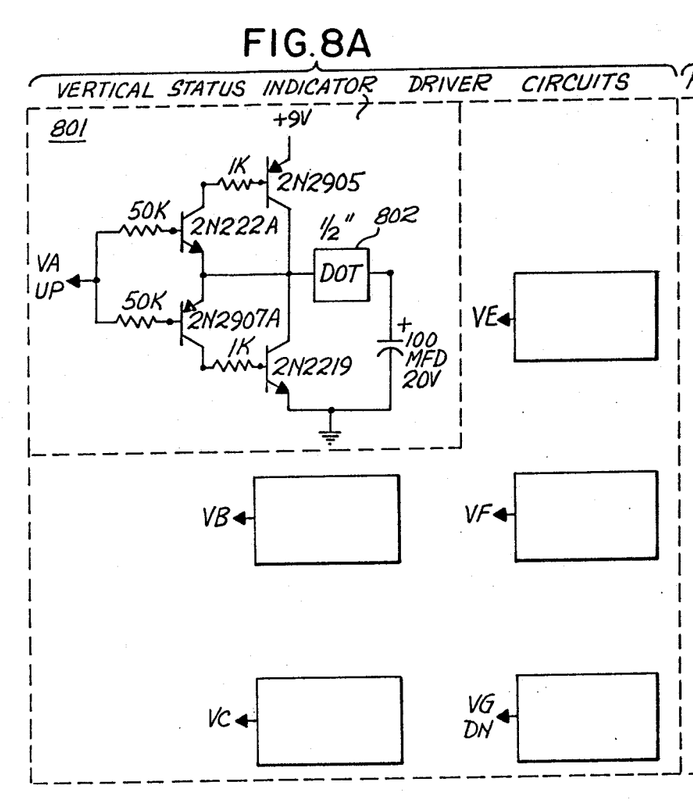
FIGS. 8A and 8B are schematic circuit diagrams of the vertical and horizontal status indicator drive circuits which are driven by the corresponding output drive voltages shown in the system schematic diagram of FIGS. 7A and 7B.
Figure 8B:
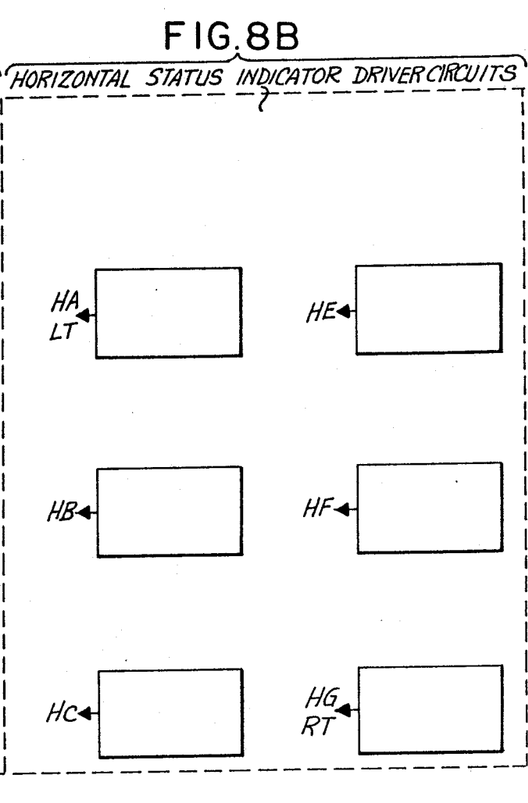
Figure 9:
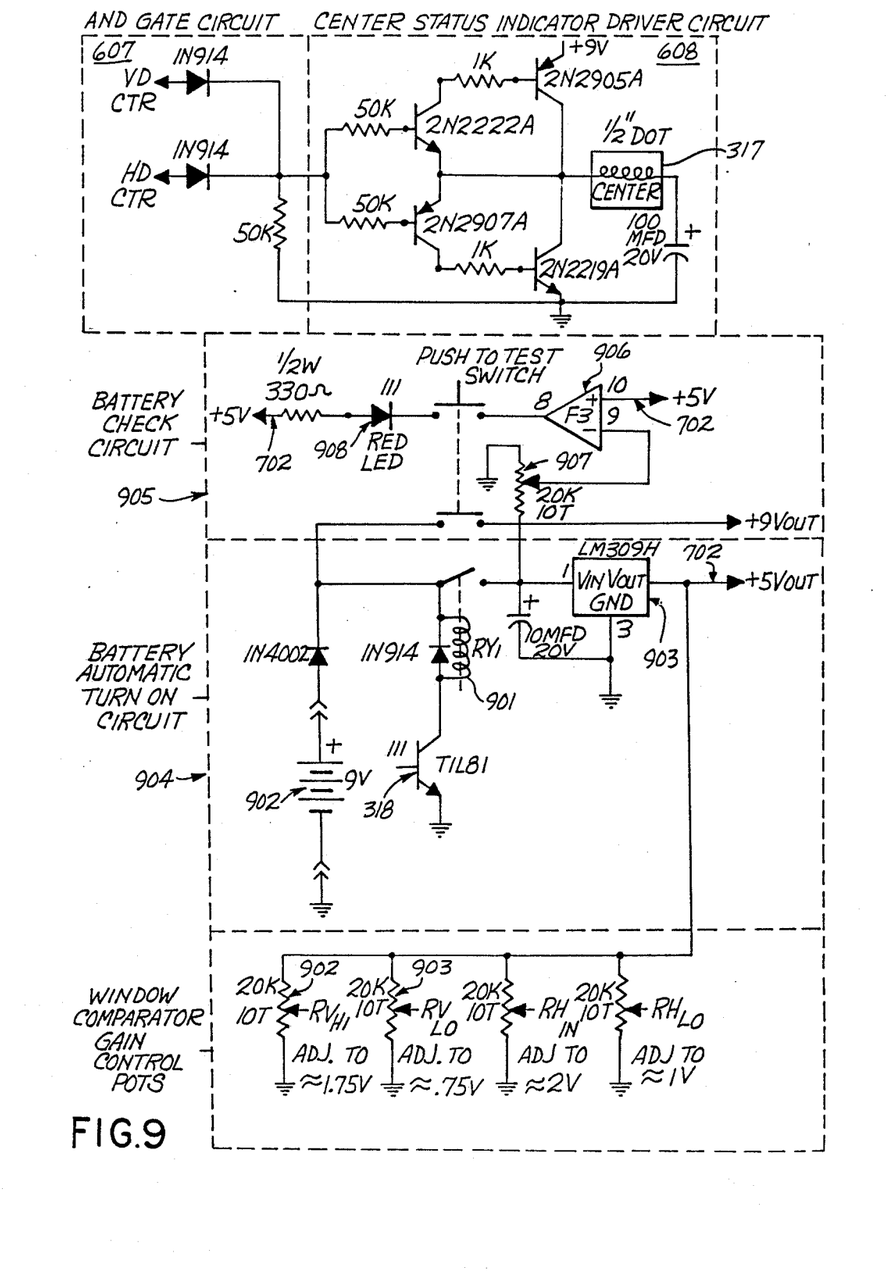
FIG. 9 is a schematic circuit diagram showing an AND gate circuit and center status indicator driver circuit which are coupled to and driven by the corresponding circuit points referenced in the system circuit schematic diagram of FIGS. 7A and 7B, FIG. 9 also showing in circuit schematic form a battery check circuit, a battery automatic turn-on circuit, and window comparator gain control potentiometers for coupling to the window comparator circuit shown in the circuit schematic of FIGS. 7A and 7B.

The present detailed schematic of preferred system embodiment as shown in FIGS. 7A, 7B, 8A, 8B, and 9, when taken together, are shown to include a signal processing circuit seen in FIGS. 7A and 7B, a battery check circuit 905 as seen in FIG. 9, and a battery operated automatic turn-on circuit 904 seen in FIG. 9 for automatically controlling the present system through light beam activation thereof as hereinafter described in more detail.

Turning now to the detailed system schematic diagram included in FIGS. 7A, 7B, 8A, 8B, and 9, a description of the signal processing circuit can be seen to commence with a consideration of the voltage that is generated when light falls on photocells 303 and 304. While this discussion describes the processing of signals for the vertical pair of photocells 303 and 304 only, it should be noted that the circuitry being described is duplicated for the pair of horizontal photocells 301 and 302 seen in FIG. 7A. The photocells themselves are enclosed in sun shields 501 as seen in FIG. 5 and are covered with a filter glass 502 of sufficient density that the voltage output of the cell is approximately in the mid-range sensitivity of the photocell.

The voltage generated by photocells 303 and 304, with light incident thereupon, is multiplied through buffer amplifiers 601 and 602, respectively, to provide a sufficient working voltage. The output of buffer amplifiers 601 and 602 is then added against reference voltage 701 and summed, down stream, in summing amplifier circuit 603. It should be noted that the gain of buffer amplifiers 601 and 602 are made adjustable to compensate for the differences in photocell characteristics provided in photocells 303 and 304. The purpose of summing amplifier 603 is to provide an arbitrary reference voltage 701 for window comparator circuit 604. It should also be noted that arbitrary reference voltage 701 is adjustable. This feature, along with further hereinafter described adjustments provided in the present signal processing circuitry, allow the sensitivity of the present landing light alignment system to be adjustable over a wide range.

The output of summing amplifier circuit 603 is coupled to window comparator circuit 604. The purpose of window comparator circuit 604 is to determine which of the status indicators carried by the cross-like target structure is to be activated. Window comparator circuit 604, is seen to include two adjustable potentiometers 902 and 903 as shown in FIG. 9, utilized to establish an arbitrary upper and lower operating limit. The output of window comparator circuit 604 is coupled to switching transistor ladder network 605. Switching transistor ladder network 605 as seen in FIG. 7B provides the capability for switching a status indicator from the ON position to the OFF position when a second status indicator is being switched to its ON position. This function provides the unique feature and requirement of single status indicator switching in the ON position during any discrete time period. The aforementioned description pertains, as hereinbefore mentioned, to each of the vertical or horizontal axis.

The output of switching transistor ladder network 605 is coupled to the appropriate status indicator driver circuit as shown in FIG. 8A. The purpose of the status indicator driver circuit as, for example, typically shown in status indicator driver circuit 801 is to provide the proper direction of a current pulse through the individual status indicator. The status indicator is a current-operated device and is driven by a magnetic coil mechanism 802 which is sensitive to current direction. In the present circuit embodiments, the status indicators utilized were Model No. 52NR06/00, manufactured by the Ferranti-Packard Company. Status indicator driver circuit 801 provides a current pulse in the proper direction.

A comparison of the center status indicator drive circuit 608 shown in FIG. 9 with the other status indicator drive circuits will show an apparent difference in that an AND gate 607 is included just prior to the status indicator drive circuit 608 only for the center status indicator. The purpose of AND gate 607 is to provide for activation of center status indicator 317 (disposed at the center of cross-like target structure 319 as seen in FIG. 3) only when two simultaneous control signals are coupled to the circuit. This provides the feature that the center status indicator 317 will activate only when both vertical and horizontal alignment are achieved.

Turning now to battery automatic turn-on circuitry 904 as shown in FIG. 9, it should be noted that light incident upon photo transistor 318 causes circuit and consequent system activation. Light incident upon photo transistor 318 generates relay coil current for energizing relay 901 which results in application of power from 9-volt battery 902 to the input of 5-volt voltage regulator circuit 903. The output of voltage regulator circuit 903 is then coupled to lead line 702 through to the leads 702 shown in FIGS. 7A and 7B for energizing the amplifiers in the present system. The function of battery automatic turn-on circuit 904 is to automatically turn off the power source supply battery 902 when aircraft landing light adjustments are not being made thereby extending power source battery 902 life.

Also, in FIG. 9, it will be seen that battery check circuit 905 includes a conventional comparator circuit 906 for comparing battery voltage 902 to a reference voltage 702. When battery voltage 902 is greater than 7 volts, comparator circuit 906 will cause red LED 908 to turn on. The 7 volt value is adjusted through variable resistor 907.

We claim:

1. A signal processing circuit comprising in combination:
   a pair of photocells, and status indicator driver circuitry for controlling status indicators;
   a d.c. voltage summing amplifier;
   a pair of buffer amplifiers coupled between said pair of photocells and said d.c. voltage summing amplifier; and,
   a window amplifier circuit and switching transistor ladder network coupled in series circuit between said d.c. voltage summing amplifier and said status indicator driver circuitry.

2. The invention according to claim 1 further comprising:
   a second pair of photocells, and further status indicator driver circuitry for controlling further status indicators;
   a further d.c. voltage summing amplifier;
   a further pair of buffer amplifiers coupled between said further pair of photocells and said further d.c. voltage summing amplifier; and,
   a further window amplifier circuit and further switching transistor ladder network coupled in series circuit between said further d.c. voltage summing amplifier and said further status indicator driver circuitry.

3. A signal processing circuit comprising in combination:
   a pair of photocells, and status indicator driver circuitry for controlling status indicators;
   a d.c. voltage assembly amplifier;
   a pair of buffer amplifiers coupled between said pair of photocells and said d.c. voltage summing amplifier;
   a window amplifier circuit and switching transistor ladder network coupled in series circuit between said d.c. voltage summing amplifier and said status indicator driver circuitry;
   a second pair of photocells, and further status indicator driver circuitry for controlling further status indicators;
   further d.c. voltage summing amplifier;
   a further pair of buffer amplifiers coupled between said further pair of photocells and said further d.c. voltage summing amplifier;
   a further window amplifier circuit and further switching transistor ladder network coupled in series circuit between said further d.c. voltage summing amplifier and said further status indicator driver circuitry;
   an AND gate having first and second input terminals, and an output terminal; and,
   said output terminal of said AND gate coupled to a center status indicator, said first input terminal of said AND gate coupled to said switching transistor ladder network, and said second input terminal of said AND gate coupled to said further switching transistor ladder network.

* * * * *